(12) United States Patent
Benedict

(10) Patent No.: US 10,465,951 B2
(45) Date of Patent: Nov. 5, 2019

(54) MAGNETO CALORIC HEAT PUMP WITH VARIABLE MAGNETIZATION

(71) Applicant: General Electric Company, Schenectady, NY (US)

(72) Inventor: Michael Alexander Benedict, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 1013 days.

(21) Appl. No.: 13/738,047

(22) Filed: Jan. 10, 2013

(65) Prior Publication Data

US 2014/0190182 A1 Jul. 10, 2014

(51) Int. Cl.
 *F25B 21/00* (2006.01)
 *F25D 11/00* (2006.01)

(52) U.S. Cl.
 CPC ...... *F25B 21/00* (2013.01); *F25B 2321/0021* (2013.01); *F25B 2321/0023* (2013.01); *F25D 11/00* (2013.01); *Y02B 30/66* (2013.01)

(58) Field of Classification Search
 CPC ............... F25B 21/00; F25B 2321/002; F25B 2321/0021; F25B 2321/0022; F25B 2321/0023; Y02B 30/66
 USPC .......................................................... 62/3.1
 See application file for complete search history.

(56) References Cited

U.S. PATENT DOCUMENTS

| 668,560 A | 2/1901 | Fulner et al. |
|---|---|---|
| 4,107,935 A | 8/1978 | Steyert, Jr. |
| 4,507,927 A | 4/1985 | Barclay |
| 4,549,155 A | 10/1985 | Halbach |
| 4,625,519 A | 12/1986 | Hakuraku et al. |
| 4,642,994 A | 2/1987 | Barclay et al. |
| 5,091,361 A | 2/1992 | Hed |
| 5,156,003 A | 10/1992 | Yoshiro et al. |
| 5,249,424 A | 10/1993 | DeGregoria et al. |
| 5,934,078 A | 8/1999 | Lawton, Jr. et al. |
| 6,332,323 B1 | 12/2001 | Reid et al. |
| 6,446,441 B1 | 9/2002 | Dean |
| 6,588,215 B1 | 7/2003 | Ghoshal |
| 6,668,560 B2 | 12/2003 | Zimm et al. |

(Continued)

FOREIGN PATENT DOCUMENTS

| CN | 101979937 | 2/2011 |
|---|---|---|
| EP | 2108904 A1 | 10/2009 |

(Continued)

OTHER PUBLICATIONS

International Search Report and Written Opinion issued in connection with PCT Application No. PCT/US2014/042485 dated Oct. 31, 2014.

(Continued)

*Primary Examiner* — John F Pettitt, III
(74) *Attorney, Agent, or Firm* — Dority & Manning, P.A.

(57) ABSTRACT

A heat pump system that uses variable magnetization to control the amount of MCM subjected to a magnetic field is provided. More particularly, the amount of MCM subjected to a magnetic field can be selected based on the amount of refrigeration needed. As such, the heat pump system can be adjusted based on e.g., changes in ambient conditions, and the energy used in operating such a heat pump system can be conserved so as to increase energy efficiency of the system.

8 Claims, 8 Drawing Sheets

(56) References Cited

U.S. PATENT DOCUMENTS

| | | | |
|---|---|---|---|
| 6,935,121 B2 | 8/2005 | Fang et al. | |
| 7,552,592 B2 | 6/2009 | Iwasaki et al. | |
| 7,644,588 B2 | 1/2010 | Shin | |
| 7,863,789 B2 * | 1/2011 | Zepp | H02K 21/024 310/190 |
| 7,897,898 B2 | 3/2011 | Muller et al. | |
| 8,099,964 B2 | 1/2012 | Saito et al. | |
| 8,209,988 B2 | 7/2012 | Zhang et al. | |
| 8,375,727 B2 | 2/2013 | Sohn | |
| 8,378,769 B2 | 2/2013 | Heitzler et al. | |
| 8,448,453 B2 | 5/2013 | Bahl et al. | |
| 8,551,210 B2 | 10/2013 | Reppel et al. | |
| 8,656,725 B2 | 2/2014 | Muller et al. | |
| 8,695,354 B2 | 4/2014 | Heitzler et al. | |
| 8,729,718 B2 | 5/2014 | Kuo et al. | |
| 8,769,966 B2 | 7/2014 | Heitzler et al. | |
| 8,869,541 B2 | 10/2014 | Heitzler et al. | |
| 8,935,927 B2 | 1/2015 | Kobayashi et al. | |
| 2003/0051774 A1 | 3/2003 | Saito | |
| 2004/0093877 A1 | 5/2004 | Wada | |
| 2004/0250550 A1 | 12/2004 | Bruck | |
| 2009/0158749 A1 | 6/2009 | Sandeman | |
| 2009/0236930 A1 * | 9/2009 | Nashiki | H02K 1/145 310/257 |
| 2009/0308080 A1 * | 12/2009 | Han | F25B 21/00 62/3.1 |
| 2010/0071383 A1 * | 3/2010 | Zhang | F25B 21/00 62/3.1 |
| 2010/0236258 A1 | 9/2010 | Heitzler et al. | |
| 2011/0062821 A1 * | 3/2011 | Chang | H02N 11/002 310/306 |
| 2011/0162388 A1 | 7/2011 | Barve et al. | |
| 2011/0173993 A1 | 7/2011 | Muller et al. | |
| 2011/0182086 A1 | 7/2011 | Mienko et al. | |
| 2011/0192836 A1 | 8/2011 | Muller et al. | |
| 2011/0239662 A1 | 10/2011 | Bahl et al. | |
| 2011/0308258 A1 | 12/2011 | Smith et al. | |
| 2012/0079834 A1 | 4/2012 | Dinesen | |
| 2012/0222427 A1 | 9/2012 | Hassen | |
| 2012/0267090 A1 | 10/2012 | Kruglick | |
| 2012/0272666 A1 | 11/2012 | Watanabe | |
| 2012/0285179 A1 * | 11/2012 | Morimoto | F25B 41/04 62/3.1 |
| 2013/0019610 A1 | 1/2013 | Zimm et al. | |
| 2013/0187077 A1 | 7/2013 | Katter | |
| 2013/0192269 A1 | 8/2013 | Wang | |
| 2013/0232993 A1 | 9/2013 | Saito et al. | |
| 2014/0165595 A1 | 6/2014 | Zimm et al. | |
| 2014/0190182 A1 | 7/2014 | Benedict | |
| 2014/0216057 A1 | 8/2014 | Oezcan | |
| 2014/0290273 A1 | 10/2014 | Benedict et al. | |
| 2014/0325996 A1 | 11/2014 | Muller | |
| 2015/0027133 A1 | 1/2015 | Benedict | |
| 2015/0168030 A1 | 6/2015 | Leonard et al. | |

FOREIGN PATENT DOCUMENTS

| | | |
|---|---|---|
| JP | 2002315243 A | 10/2002 |
| JP | 2007147136 | 6/2007 |
| JP | 2007/291437 A | 11/2007 |
| JP | 2008051412 | 3/2008 |
| WO | WO 02/12800 | 2/2002 |
| WO | WO 03016794 | 2/2003 |
| WO | WO 2011/034594 A1 | 3/2011 |

OTHER PUBLICATIONS

International Search Report and Written Opinion issued in connection with PCT Application No. PCT/US2014/017431 dated May 16, 2014.

International search report issued in connection with PCT/US2013/070518, dated Jan. 30, 2014.

Tetsuji Okamura, Performance of a room-temperature rotary magnet refrigerator, Nov. 28, 2005, Elsevier.

* cited by examiner

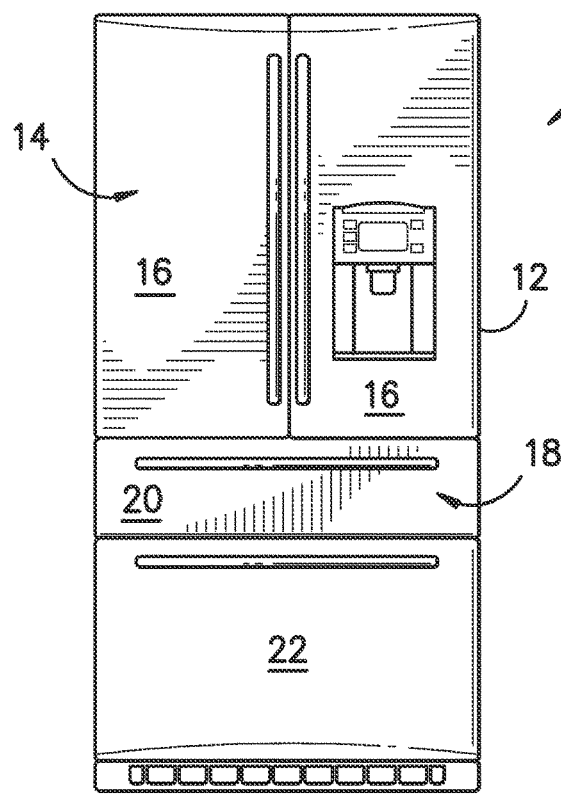
FIG. -1-
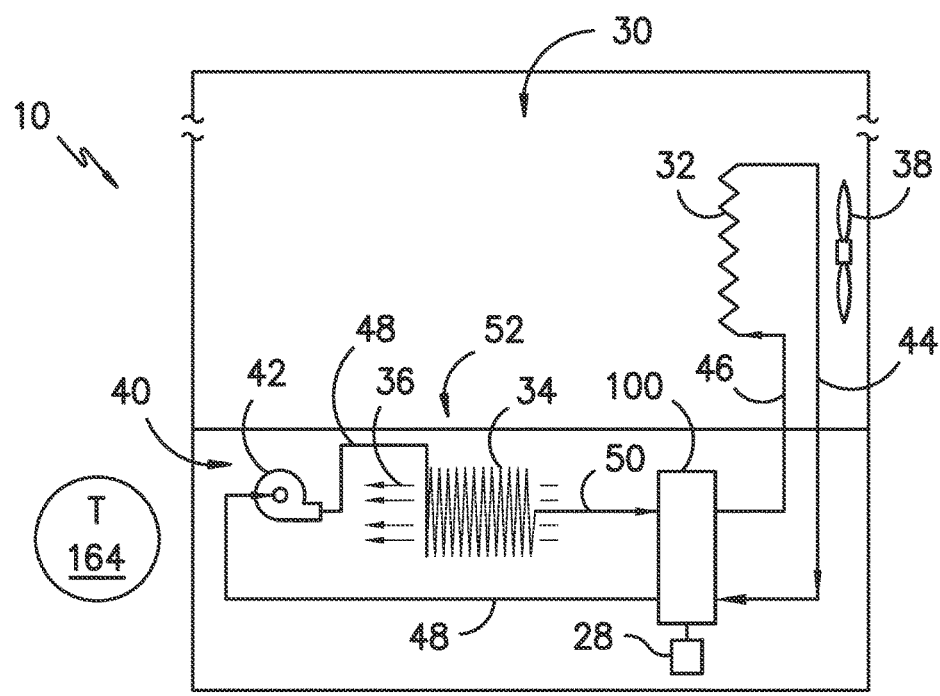
FIG. -2-

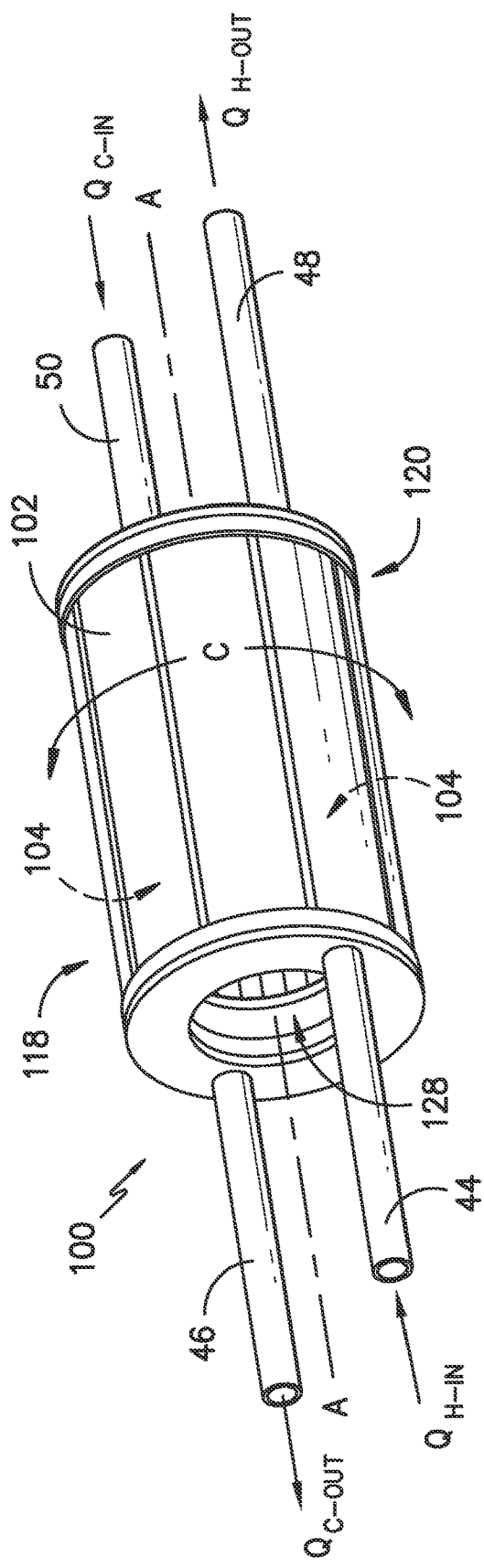
FIG. -3-

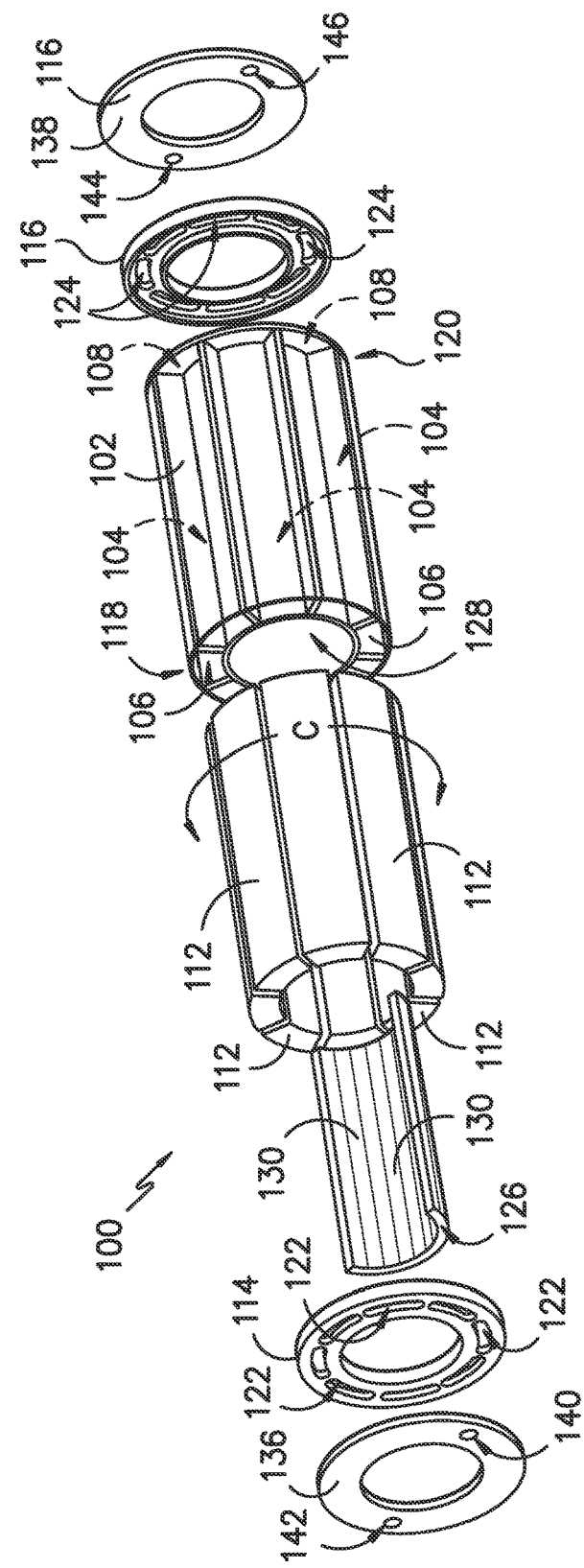

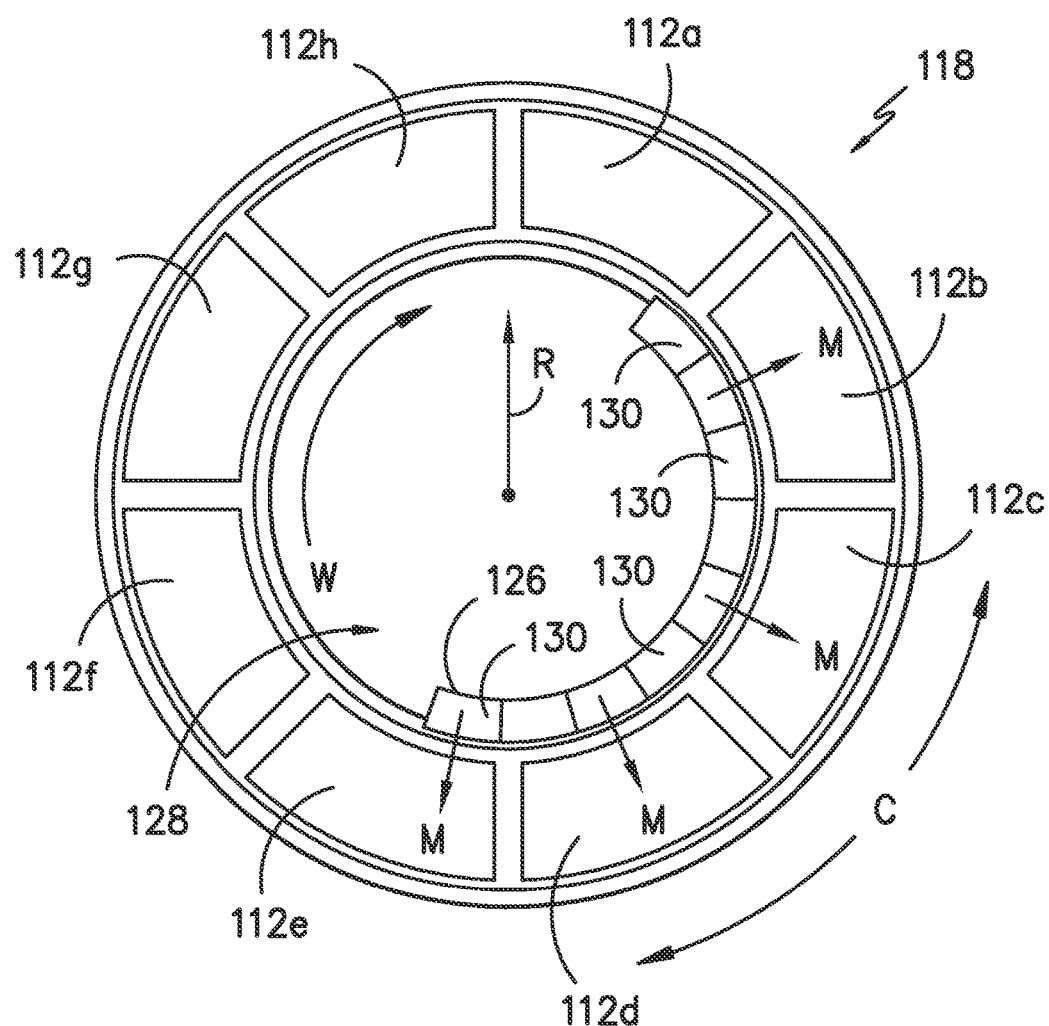
FIG. -5-

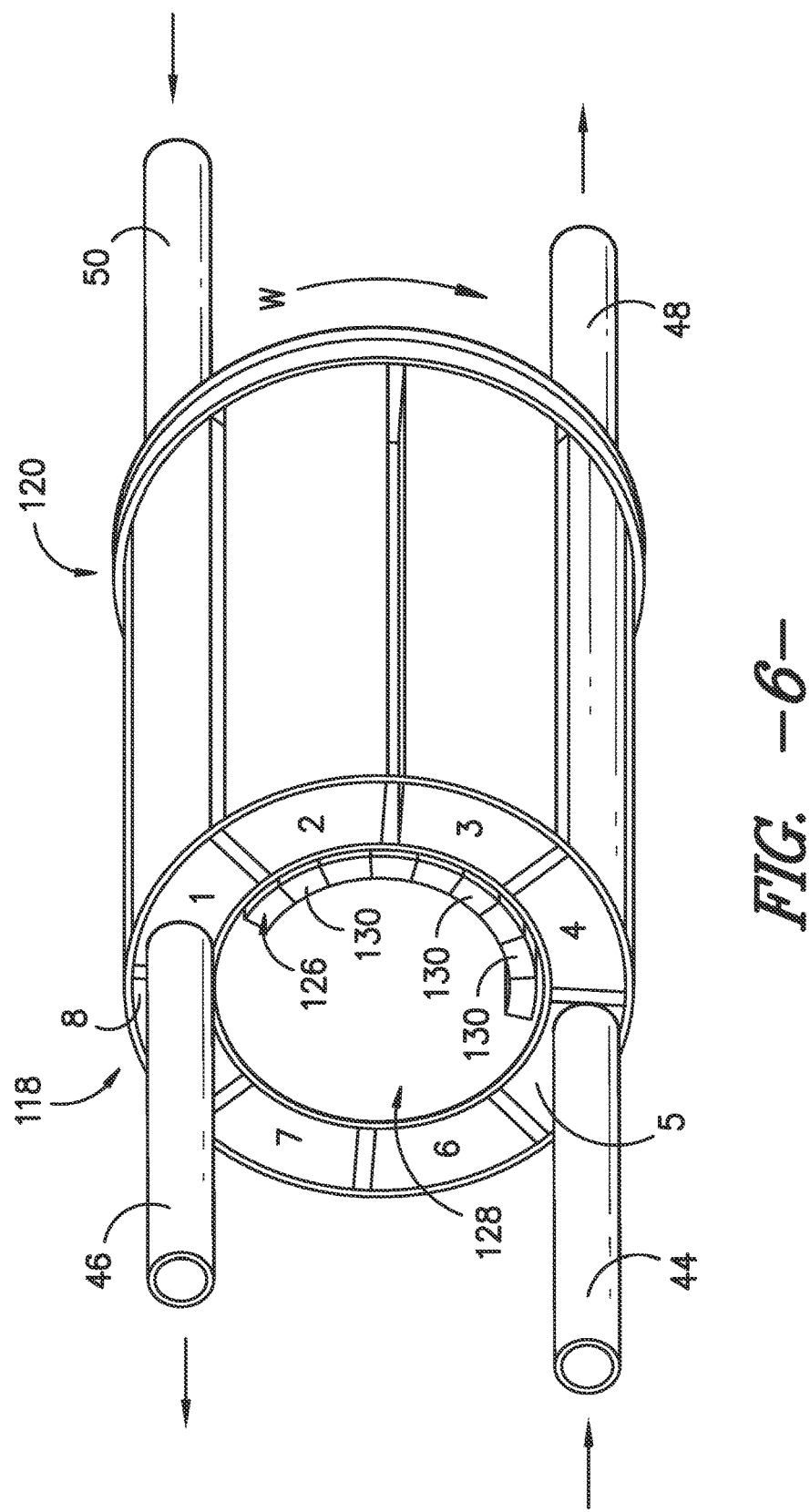

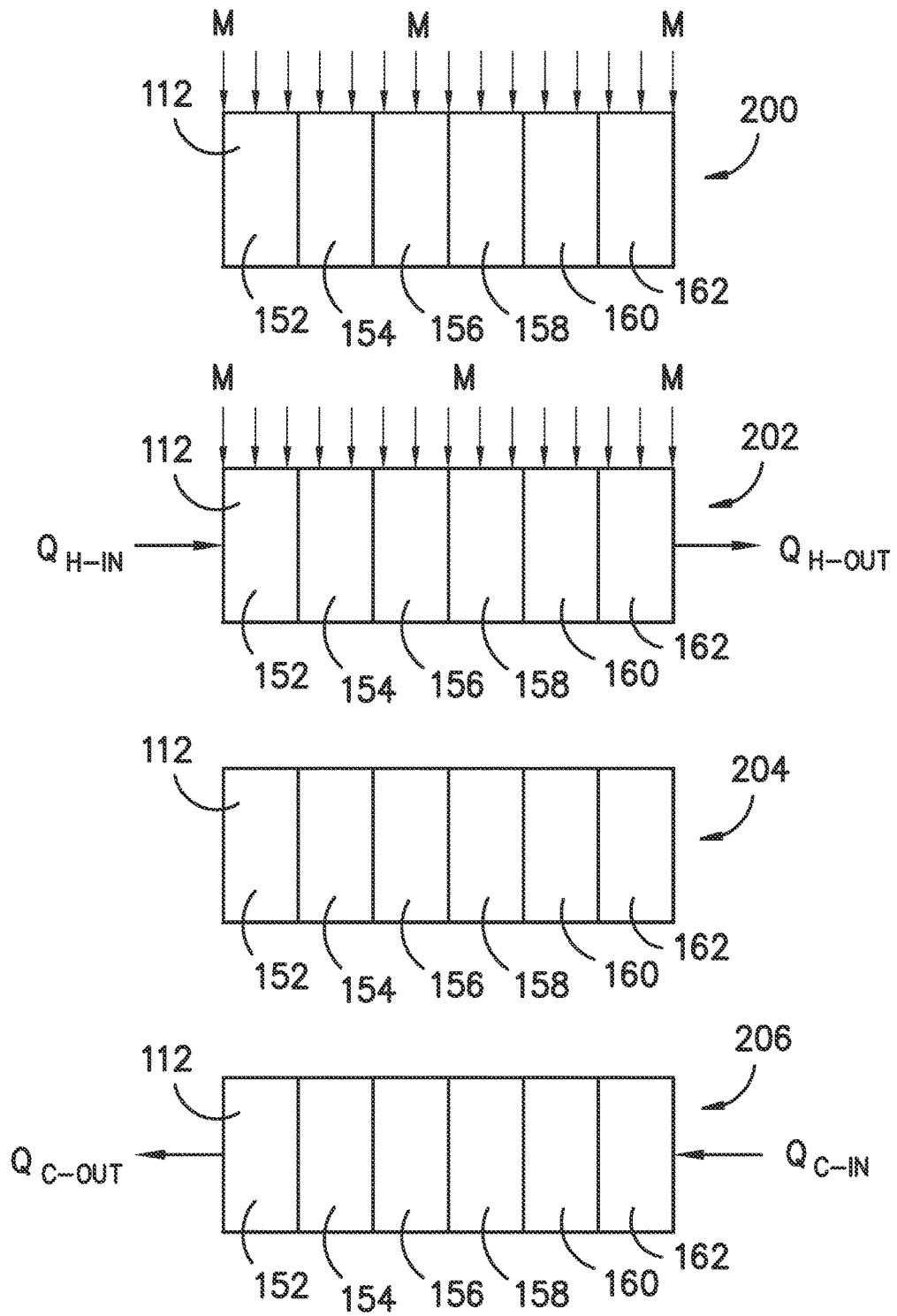
FIG. —7—

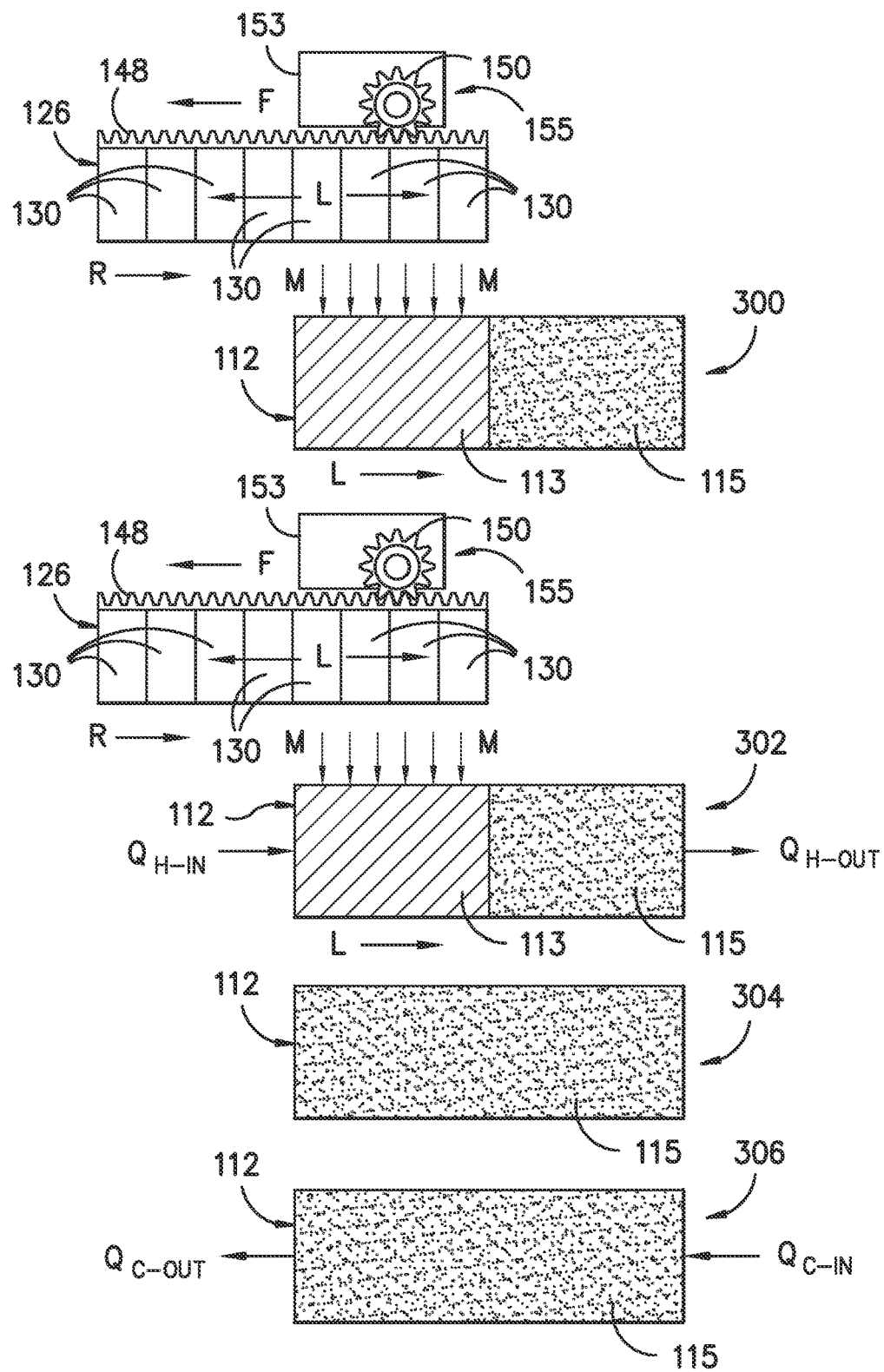
FIG. -8-

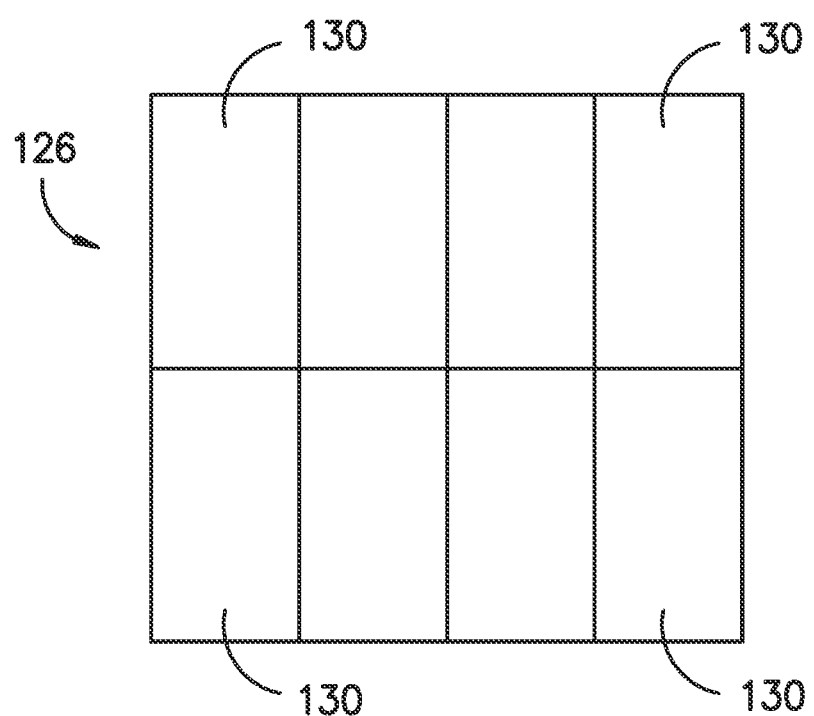
FIG. -9-

MAGNETO CALORIC HEAT PUMP WITH VARIABLE MAGNETIZATION

FIELD OF THE INVENTION

The subject matter of the present disclosure relates generally to a heat pump system that uses variable magnetization of magneto caloric materials to control the amount of heat exchange.

BACKGROUND OF THE INVENTION

Conventional refrigeration technology typically utilizes a heat pump that relies on compression and expansion of a fluid refrigerant to receive and reject heat in a cyclic manner so as to effect a desired temperature change or i.e. transfer heat energy from one location to another. This cycle can be used to provide e.g., for the receiving of heat from a refrigeration compartment and the rejecting of such heat to the environment or a location that is external to the compartment. Other applications include air conditioning of residential or commercial structures. A variety of different fluid refrigerants have been developed that can be used with the heat pump in such systems.

While improvements have been made to such heat pump systems that rely on the compression of fluid refrigerant, at best such can still only operate at about 45 percent or less of the maximum theoretical Carnot cycle efficiency. Also, some fluid refrigerants have been discontinued due to environmental concerns. The range of ambient temperatures over which certain refrigerant-based systems can operate may be impractical for certain locations. Other challenges with heat pumps that use a fluid refrigerant exist as well.

Magneto caloric materials (MCMs)—i.e. materials that exhibit the magneto caloric effect—provide a potential alternative to fluid refrigerants for heat pump applications. In general, the magneto caloric effect refers to a process of entropic change whereby the magnetic moments of an MCM will become more ordered under an increasing, externally applied magnetic field and cause the MCM to generate heat. Conversely, decreasing the externally applied magnetic field will allow the magnetic moments of the MCM to become more disordered and allow the MCM to absorb heat. Some MCMs exhibit the opposite behavior—i.e. generating heat when the magnetic field is removed (which are sometimes referred to as para-magneto caloric material but both types are referred to collectively herein as magneto caloric material or MCM). The theoretical Carnot cycle efficiency of a refrigeration cycle based on an MCM can be significantly higher than for a comparable refrigeration cycle based on a fluid refrigerant. As such, a heat pump system that can effectively use an MCM would be useful.

Challenges exist to the practical and cost competitive use of an MCM, however. In addition to the development of suitable MCMs, equipment that can attractively utilize an MCM is still needed. It is desirable to provide for the transfer or heat to and from the MCM preferably in a continuous manner so that the equipment does not operate in a start and stop fashion that can be inefficient. Also, currently proposed equipment may require relatively large and expensive magnets, may be impractical for use in e.g., appliance refrigeration, and may not otherwise operate with enough efficiency to justify capital cost.

Additionally, as stated above, the ambient conditions under which a heat pump may be needed can vary substantially. For example, for a refrigerator appliance placed in a garage or located in a non-air conditioned space, ambient temperatures can range from below freezing to over 90° F. Some MCMs are capable of accepting and generating heat only within a much narrower temperature range than presented by such ambient conditions.

Also, the amount of MCM that needs to be magnetized can change as ambient conditions change. For example, for a refrigeration appliance, as the ambient temperature decreases, the amount of MCM that must be magnetized to properly maintain the temperature of food items stored inside the appliance can also decrease. As energy is required to magnetize the MCM, efficiency is reduced when more MCM than necessary is magnetized. However, no practical solutions for controlling the amount of MCM material to be magnetized has been proposed—particularly for a continuously operating machine.

Accordingly, a heat pump system that can address certain challenges such as those identified above would be useful. Such a heat pump system that can also be used in e.g., a refrigerator appliance would also be useful.

BRIEF DESCRIPTION OF THE INVENTION

The present invention provides a heat pump system that uses variable magnetization to control the amount of MCM subjected to a magnetic field. More particularly, the amount of MCM subjected to a magnetic field can be selected or adjusted based on the amount of refrigeration needed. As such, the heat pump system can be adjusted based on e.g., changes in ambient conditions, and the energy used in operating such a heat pump system can be conserved so as to increase energy efficiency of the system. The heat pump can be used for applications where heating, cooling, or both are needed. Additional aspects and advantages of the invention will be set forth in part in the following description, or may be apparent from the description, or may be learned through practice of the invention.

In one exemplary aspect, the present invention provide a method of operating a magneto caloric device. This exemplary method comprises the steps of providing a magnetic field and magneto caloric material; positioning the magneto caloric material into the magnetic field; removing the magneto caloric material from the magnetic field; and controlling the extent of cooling or heating of the magneto caloric material by adjusting the amount of the magneto caloric material subjected to the magneto caloric effect during said steps of positioning and removing.

In another exemplary embodiment, the present invention provides a heat pump system that includes a regenerator housing defining a circumferential direction and rotatable about an axial direction, the axial direction extending between a first end and a second end of the regenerator housing. The regenerator housing includes a plurality of chambers with each chamber extending longitudinally along the axial direction between a pair of openings. The plurality of chambers are arranged proximate to each other along the circumferential direction. A plurality of stages are provide with each stage comprising magneto caloric material positioned within one of the plurality of chambers and extending along the axial direction.

This exemplary embodiment further includes a pair of valves with a first valve attached to the first end of the regenerator housing and a second valve attached to the second end of the regenerator housing. The first valve and second valve each include a plurality of apertures spaced apart from each other along the circumferential direction with each aperture positioned adjacent to one of the pair of openings of one of the plurality of chambers. A magnetic element is positioned proximate to the regenerator housing and extends along the axial direction. The magnetic element creates a magnetic field and is positioned so that a subset of the plurality of stages are moved in and out of the magnetic field as the regenerator housing is rotated about the axial direction.

This exemplary system also includes a pair of seals with a first seal positioned adjacent to the first valve and a second seal adjacent to the second valve such that the regenerator housing and the pair of valves are rotatable relative to the pair of seals. The first seal and the second seal each include a pair of ports positioned in an opposing manner relative to each other and also positioned so that each port can selectively align with at least one of the pair of openings of the plurality of chambers as the regenerator housing is rotated about the axial direction.

An actuator is configured for moving the magnetic element, the regenerator housing, or both along the axial direction so as to control the amount of magneto caloric material experiencing the magneto caloric effect as said regenerator housing is rotated about the axial direction.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 provides an exemplary embodiment of a refrigerator appliance of the present invention.

FIG. 2 is a schematic illustration of an exemplary heat pump system of the present invention positioned in an exemplary refrigerator with a machinery compartment and a refrigerated compartment.

FIG. 3 provides a perspective view of an exemplary heat pump of the present invention.

FIG. 4 is an exploded view of the exemplary heat pump of FIG. 3.

FIG. 5 is a cross-sectional view of the exemplary heat pump of FIG. 3.

FIG. 6 is perspective view of the exemplary heat pump of FIG. 3. Seals located at the ends of a regenerator housing have been removed for purposes of further explanation of this exemplary embodiment of the invention as set forth below.

FIG. 7 is a schematic representation of exemplary steps in the use of a stage of the heat pump of FIG. 3.

FIG. 8 is another schematic representation of exemplary steps in the use of a stage of the heat pump of FIG. 3 and in which only a portion of the stage is subjected to a magnetic field so as to delimit the amount of magneto caloric material subjected to the magneto caloric effect.

FIG. 9 is a schematic view of a magnet as may be used with the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to FIG. 1, an exemplary embodiment of an appliance refrigerator 10 is depicted as an upright refrigerator having a cabinet or casing 12 that defines a number of internal storage compartments or chilled chambers. In particular, refrigerator appliance 10 includes upper fresh-food compartments 14 having doors 16 and lower freezer compartment 18 having upper drawer 20 and lower drawer 22. The drawers 20, 22 are "pull-out" type drawers in that they can be manually moved into and out of the freezer compartment 18 on suitable slide mechanisms. Refrigerator 10 is provided by way of example only. Other configurations for a refrigerator appliance may be used as well including appliances with only freezer compartments, only chilled compartments, or other combinations thereof different from that shown in FIG. 1. In addition, the heat pump and heat pump system of the present invention is not limited to appliances and may be used in other applications as well such as e.g., air-conditioning, electronics cooling devices, and others. Thus, it should be understood that while the use of a heat pump to provide cooling within a refrigerator is provided by way of example herein, the present invention may also be used to provide for heating applications as well.

FIG. 2 is a schematic view of another exemplary embodiment of a refrigerator appliance 10 including a refrigeration compartment 30 and a machinery compartment 40. In particular, machinery compartment 40 includes a heat pump system 52 having a first heat exchanger 32 positioned in the refrigeration compartment 30 for the removal of heat therefrom. A heat transfer fluid such as e.g., an aqueous solution, flowing within first heat exchanger 32 receives heat from the refrigeration compartment 30 thereby cooling its contents. A fan 38 may be used to provide for a flow of air across first heat exchanger 32 to improve the rate of heat transfer from the refrigeration compartment 30.

The heat transfer fluid flows out of first heat exchanger 32 by line 44 to heat pump 100. As will be further described herein, the heat transfer fluid receives additional heat from magneto caloric material (MCM) in heat pump 100 and carries this heat by line 48 to pump 42 and then to second heat exchanger 34. Heat is released to the environment, machinery compartment 40, and/or other location external to refrigeration compartment 30 using second heat exchanger 34. A fan 36 may be used to create a flow of air across second heat exchanger 34 and thereby improve the rate of heat transfer to the environment. Pump 42 connected into line 48 causes the heat transfer fluid to recirculate in heat pump system 52. Motor 28 is in mechanical communication with heat pump 100 as will further described.

From second heat exchanger 34 the heat transfer fluid returns by line 50 to heat pump 100 where, as will be further described below, the heat transfer fluid loses heat to the MCM in heat pump 100. The now colder heat transfer fluid flows by line 46 to first heat exchanger 32 to receive heat from refrigeration compartment 30 and repeat the cycle as just described.

Heat pump system 52 is provided by way of example only. Other configurations of heat pump system 52 may be used as well. For example, lines 44, 46, 48, and 50 provide fluid communication between the various components of the heat pump system 52 but other heat transfer fluid recirculation loops with different lines and connections may also be employed. For example, pump 42 can also be positioned at other locations or on other lines in system 52. Still other configurations of heat pump system 52 may be used as well.

FIGS. 3, 4, 5, and 6 depict various views of an exemplary heat pump 100 of the present invention. Heat pump 100 includes a regenerator housing 102 that extends longitudinally along an axial direction between a first end 118 and a second end 120. The axial direction is defined by axis A-A about which regenerator housing 102 rotates. A radial direction R is defined by a radius extending orthogonally from the axis of rotation A-A (FIG. 5). A circumferential direction is indicated by arrows C.

Regenerator housing 102 defines a plurality of chambers 104 that extend longitudinally along the axial direction defined by axis A-A. Chambers 104 are positioned proximate or adjacent to each other along circumferential direction C. Each chamber 104 includes a pair of openings 106 and 108 positioned at opposing ends 118 and 120 of regenerator housing 102.

Heat pump 100 also includes a plurality of stages 112 that include MCM. Each stage 112 is located in one of the chambers 104 and extends along the axial direction. For the exemplary embodiment shown in the figures, heat pump 100 includes eight stages 112 positioned adjacent to each other along the circumferential direction as shown and extending longitudinally along the axial direction. As will be understood by one of skill in the art using the teachings disclosed herein, a different number of stages 112 other than eight may be used as well.

A pair of valves 114 and 116 are attached to regenerator housing 102 and rotate therewith along circumferential direction C. More particularly, a first valve 114 is attached to first end 118 and a second valve 116 is attached to second end 120. Each valve 114 and 116 includes a plurality of apertures 122 and 124, respectively. For this exemplary embodiment, apertures 122 and 124 are configured as circumferentially-extending slots that are spaced apart along circumferential direction C. Each aperture 122 is positioned adjacent to a respective opening 106 of a chamber 104. Each aperture 124 is positioned adjacent to a respective opening 108 of a chamber 104. Accordingly, a heat transfer fluid may flow into a chamber 104 through a respective aperture 122 and opening 106 so as to flow through the MCM in a respective stage 112 and then exit through opening 108 and aperture 124. A reverse path can be used for flow of the heat transfer fluid in the opposite direction through the stage 112 of a given chamber 104.

Regenerator housing 102 defines a cavity 128 that is positioned radially inward of the plurality of chambers 104 and extends along the axial direction between first end 118 and second end 120. A magnetic element 126 is positioned within cavity 128 and, for this exemplary embodiment, extends along the axial direction between first end 118 and second end 120. Magnetic element 126 provides a magnetic field that is directed radially outward as indicated by arrows M in FIG. 5.

The positioning and configuration of magnetic element 126 is such that only a subset of the plurality of stages 112 is within magnetic field M at any one time. For example, as shown in FIG. 5, stages 112a and 112e are partially within the magnetic field while stages 112b, 112c, and 112d are fully within the magnetic field M created by magnetic element 126. Conversely, the magnetic element 126 is configured and positioned so that stages 112f, 112g, and 112h are completely or substantially out of the magnetic field created by magnetic element 126. However, as regenerator housing 102 is continuously rotated along the circumferential direction as shown by arrow W, the subset of stages 112 within the magnetic field will continuously change as some stages 112 will enter magnetic field M and others will exit.

A pair of seals 136 and 138 is provided with the seals positioned in an opposing manner at the first end 118 and second end 120 of regenerator housing 102. First seal 136 has a first inlet port 140 and a first outlet port 142 and is positioned adjacent to first valve 114. As shown, ports 140 and 142 are positioned 180 degrees apart about the circumferential direction C of first seal 136. However, other configurations may be used. For example, ports 140 and 142 may be positioned within a range of about 170 degrees to about 190 degrees about the circumferential direction C as well. First valve 114 and regenerator housing 102 are rotatable relative to first seal 136. Ports 140 and 142 are connected with lines 44 and 46 (FIG. 1), respectively. As such, the rotation of regenerator housing 102 about axis A-A sequentially places lines 44 and 46 in fluid communication with at least two stages 112 of MCM at any one time as will be further described.

Second seal 138 has a second inlet port 144 and a second outlet port 146 and is positioned adjacent to second valve 116. As shown, ports 144 and 146 are positioned 180 degrees apart about the circumferential direction C of second seal 116. However, other configurations may be used. For example, ports 144 and 146 may be positioned within a range of about 170 degrees to about 190 degrees about the circumferential direction C as well. Second valve 116 and regenerator housing 102 are rotatable relative to second seal 138. Ports 144 and 146 are connected with lines 50 and 48 (FIG. 1), respectively. As such, the rotation of regenerator housing 102 about axis A-A sequentially places lines 48 and 50 in fluid communication with at least two stages 112 of MCM at any one time as will be further described. Notably, at any one time during rotation of regenerator housing 102, lines 46 and 50 will each be in fluid communication with at least one stage 112 while lines 44 and 48 will also be in fluid communication with at least one other stage 112 located about 180 degrees away along the circumferential direction.

FIG. 7 illustrates an exemplary method of the present invention using a schematic representation that follows the same stage 112 of MCM in regenerator housing 102 as it rotates in the direction of arrow W between positions 1 through 8 as shown in FIG. 6. During step 200, stage 112 is fully within magnetic field M, which causes the magnetic moments of the material to orient and the MCM to heat as part of the magneto caloric effect. Ordering of the magnetic field is created and maintained as stage 112 is rotated sequentially through positions 2, 3, and then 4 (FIG. 6) as regenerator housing 102 is rotated in the direction of arrow W. During the time at positions 2, 3, and 4, the heat transfer fluid dwells in the MCM of stage 112 and, therefore, is heated. More specifically, the heat transfer fluid does not flow through stage 112 because the openings 106, 108, 122, and 124 corresponding to stage 112 in positions 2, 3, and 4 are not aligned with any of the ports 140, 142, 144, or 146.

In step 202, as regenerator housing 102 continues to rotate in the direction of arrow W, stage 112 will eventually reach position 5. As shown in FIGS. 3 and 6, at position 5 the heat transfer fluid can flow through the material as first inlet port 140 is now aligned with an opening 122 in first valve 114 and an opening 106 at the first end 118 of stage 112 while second outlet port 146 is aligned with an opening 124 in second valve 116 at the second end 120 of stage 112. As indicated by arrow $Q_{H\text{-}OUT}$, heat transfer fluid in stage 112, now heated by the MCM, can travel out of regenerator housing 102 and along line 48 to the second heat exchanger 34. At the same time, and as indicated by arrow $Q_{H\text{-}IN}$, heat transfer fluid from first heat exchanger 32 flows into stage 112 from line 44 when stage 112 is at position 5. Because heat transfer fluid from the first heat exchanger 32 is relatively cooler than the MCM in stage 112, the MCM will lose heat to the heat transfer fluid.

Referring again to FIG. 7 and step 204, as regenerator housing 102 continues to rotate in the direction of arrow W, stage 112 is moved sequentially through positions 6, 7, and 8 where stage 112 is completely or substantially out of magnetic field M. The absence or lessening of the magnetic field is such that the magnetic moments of the material become disordered and the MCM absorbs heat as part of the magneto caloric effect. During the time in positions 6, 7, and 8, the heat transfer fluid dwells in the MCM of stage 112 and, therefore, is cooled by losing heat to the MCM as the magnetic moments disorder. More specifically, the heat transfer fluid does not flow through stage 112 because the openings 106, 108, 122, and 124 corresponding to stage 112 when in positions 6, 7, and 8 are not aligned with any of the ports 140, 142, 144, or 146.

Referring to step 206 of FIG. 7, as regenerator housing 102 continues to rotate in the direction of arrow W, stage 112 will eventually reach position 1. As shown in FIGS. 3 and 6, at position 1 the heat transfer fluid in stage 112 can flow through the material as second inlet port 144 is now aligned with an opening 124 in second valve 116 and an opening 108 at the second end 120 while first outlet port 142 is aligned with an opening 122 in first valve 114 and opening 106 at first end 118. As indicated by arrow $Q_{C\text{-}OUT}$, heat transfer fluid in stage 112, now cooled by the MCM, can travel out of regenerator housing 102 and along line 46 to the first heat exchanger 32. At the same time, and as indicated by arrow $Q_{C\text{-}IN}$, heat transfer fluid from second heat exchanger 34 flows into stage 112 from line 50 when stage 112 is at position 5. Because heat transfer fluid from the second heat exchanger 34 is relatively warmer than the MCM in stage 112 at position 5, the MCM will lose some of its heat to the heat transfer fluid. The heat transfer fluid now travels along line 46 to the first heat exchanger 32 to receive heat and cool the refrigeration compartment 30.

As regenerator housing 102 is rotated continuously, the above described process of placing stage 112 in and out of magnetic field M is repeated. Additionally, the size of magnetic field M and regenerator housing 102 are such that a subset of the plurality of stages 112 is within the magnetic field at any given time during rotation. Similarly, a subset of the plurality of stages 112 are outside (or substantially outside) of the magnetic field at any given time during rotation. Additionally, at any given time, there are at least two stages 112 through which the heat transfer fluid is flowing while the other stages remain in a dwell mode. More specifically, while one stage 112 is losing heat through the flow of heat transfer fluid at position 5, another stage 112 is receiving heat from the flowing heat transfer fluid at position 1 while all remaining stages 112 are in dwell mode. As such, the system can be operated continuously to provide a continuous recirculation of heat transfer fluid in heat pump system 52 as stages 112 are each sequentially rotated through positions 1 through 8.

As will be understood by one of skill in the art using the teachings disclosed herein, the number of stages for housing 102, the number of ports in valve 114 and 116, and/or other parameters can be varied to provide different configurations of heat pump 100 while still providing for continuous operation. For example, each valve could be provided within two inlet ports and two outlet ports so that heat transfer fluid flows through at least four stages 112 at any particular point in time. Alternatively, regenerator housing 102, valves 122 and 124, and/or seals 136 and 138 could be constructed so that e.g., at least two stages are in fluid communication with an inlet port and outlet port at any one time. Other configurations may be used as well.

As stated, stage 112 includes MCM extending along the axial direction of flow. The MCM may be constructed from a single magneto caloric material or may include multiple different magneto caloric materials. By way of example, appliance 10 may be used in an application where the ambient temperature changes over a substantial range. However, a specific magneto caloric material may exhibit the magneto caloric effect over only a much narrower temperature range. As such, it may be desirable to use a variety of magneto caloric materials within a given stage to accommodate the wide range of ambient temperatures over which appliance 10 and/or heat pump 100 may be used.

Accordingly, as shown in FIG. 7, each stage 112 can be provided with zones 152, 154, 156, 158, 160, and 162 of different magneto caloric materials. Each such zone includes an MCM that exhibits the magneto caloric effect at a different temperature or a different temperature range than an adjacent zone along the axial direction of stage 112. For example, zone 152 may exhibit the magnet caloric effect at a temperature less than the temperature at which zone 154 exhibits the magnet caloric effect, which may be less than such temperature for zone 156, and so on. Other configurations may be used as well. By configuring the appropriate number sequence of zones of MCM, heat pump 100 can be operated over a substantial range of ambient temperatures.

FIG. 8 illustrates another exemplary method of the present invention using another schematic illustration that follows the same stage 112 of MCM in regenerator housing 102 as it rotates in the direction of arrow W between positions 1 through 8 as shown in FIG. 6. Steps 300, 302, 304, and 306 are similar to steps 200, 202, 204, and 206 of FIG. 7. Magneto caloric material of stage 112 is positioned into magnetic field M (steps 300 and 302) and then removed (steps 304 and 306) from magnetic field M to provide heating and cooling of stage 112 as previously described. However, unlike the exemplary aspect of the present invention set forth in FIG. 7, in FIG. 8 the extent of cooling or heating of the magneto caloric material can be controlled by changing or adjusting the amount of magneto caloric material subjected to the magneto caloric effect during these steps.

More particularly, for this exemplary aspect of the invention, heat pump 100 is equipped with an actuator 155 that is configured for moving magnetic element 126, stage 112, or both along the axial direction so as to control the amount of magneto caloric material experiencing the magneto caloric effect as the regenerator housing is rotated in the direction or arrow W. For the exemplary embodiment shown, magnetic element 126 is provided with a rack 148 and pinion 150 connected with a motor 152. Motor 152 can be used to rotate pinion 150 so as to cause magnetic element 126 to move in the direction or arrow F or R. By moving magnetic element 126 in the direction of arrow F, only a portion 113 of the magneto caloric material of stage 112 is subjected to magnetic field F so as to undergo the magneto caloric effect while another portion 115 remains out of the magnetic field. Accordingly, the amount of magneto caloric material placed into a magnetic field as regenerator housing 102 is rotated about the axial direction can be controlled (e.g., reduced or increased) depending upon e.g., ambient conditions, how much refrigeration is needed, and/or other variables so as to conserve energy.

Actuator 155 is not limited to the exemplary embodiment shown in FIG. 8 and other configurations may be used as well. For example, instead of rack 148 and pinion 150, a solenoid, linear actuator, hydraulic piston, and other mechanisms may be used as will be understood by one of skill in the art. In addition, instead of moving magnetic element 126 relative to stage 112, actuator 155 could be configured to move regenerator housing 102 and, therefore, stage 112 relative to magnetic element 126. Alternatively, both magnetic element 126 and housing 102 could be moved relative to each other.

Other methods may be used as well to control the amount of magneto caloric material subjected to a magnetic field and the magneto caloric effect. For example, magnetic element 126 could be constructed from a plurality of magnets 130 placed side by side along longitudinal axis L in a Halbach array as shown in FIG. 8. Although the magnets 130 are shown in a first configuration that is linear in FIG. 8, magnets 130 could be changed to a second configuration in which magnets 130 are stacked as shown in FIG. 9 so as to decrease the size of the magnetic field. Other techniques to change the configuration of magnets 130 may be used as well.

Although shown as a single stage 112 of magneto caloric material in FIG. 8, it will be understood that stage 112 could comprise multiple zones of magneto caloric material arranged along the longitudinal direction of stage 112 as previously described with regard to FIG. 7. Accordingly, the number of zones of magneto caloric material in a given stage 112 that are subjected to the magneto caloric effect can be carefully controlled as previously described with regard to FIG. 8 so as to provide the desired amount of heating and cooling.

Various methods may be employed to determine the amount of magneto caloric material (or the number of zones of magneto caloric material) for a stage 112 that should be subjected to the magneto caloric effect so as to control the amount of heating and cooling as previously described. For example, a temperature sensor 164 could be provided to measure the ambient temperature. The temperature measurement can then be used to determine e.g., how much MCM should be subjected to the magneto caloric effect. For example, as the ambient temperature decreases, less MCM may be used and vice versa. Alternatively, or in addition thereto, a temperature sensor could be used to determine the temperature in the refrigerator compartment 30 and, therefore, how much heat energy must be removed to provide proper cooling. This information could then be used to control the amount of MCM material used. Still other techniques could be employed as well.

Referring now to FIGS. 4, 5, and 6, magnetic element 126 is constructed in the shape of an arc from a plurality of magnets 130 arranged in a Halbach array for this exemplary embodiment. More specifically, magnets 130 are arranged so that magnetic element 126 provides a magnetic field M located radially outward of magnetic element 126 and towards regenerator housing 102 while minimal or no magnetic field is located radially-inward towards the axis of rotation A-A. Magnetic field M may be aligned in a curve or arc shape. A variety of other configurations may be used as well for magnetic element 126 and/or its resulting magnetic field. For example, magnetic element 126 could be constructed from a first plurality of magnets positioned in cavity 128 in a Halbach array that directs the field outwardly while a second plurality of magnetics is positioned radially outward of regenerator housing 102 and arranged to provide a magnetic field that is located radially inward to the regenerator housing 102. In still another embodiment, magnetic element 128 could be constructed from a plurality of magnets positioned radially outward of regenerator housing 102 and arranged to provide a magnetic field that is located radially inward towards the regenerator housing 102. Other configurations of magnetic element 128 may be provided as well. For example, coils instead of magnets may be used to create the magnetic field desired.

For this exemplary embodiment, the arc created by magnetic element 128 provides a magnetic field extending circumferentially about 180 degrees. In still another embodiment, the arc created by magnetic element 128 provides a magnetic field extending circumferentially in a range of about 170 degrees to about 190 degrees.

A motor 28 is in mechanical communication with regenerator housing 102 and provides for rotation of housing 102 about axis A-A. By way of example, motor 28 may be connected directly with housing 102 by a shaft or indirectly through a gear box. Other configurations may be used as well.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A heat pump system, comprising:
a regenerator housing defining an axial direction extending between a first end and a second end of the regenerator housing, the regenerator housing further defining a circumferential direction and a radial direction relative to the axial direction, the regenerator housing being rotatable about the axial direction, the regenerator housing comprising a plurality of chambers directing a heat transfer fluid therethrough along a fluid path, with each chamber extending longitudinally along the axial direction between a pair of openings, the plurality of chambers arranged proximate to each other along the circumferential direction;
a plurality of stages, each stage comprising magneto caloric material positioned within one of the plurality of chambers and extending along the axial direction;
a pair of valves comprising a first valve attached to the first end of the regenerator housing and a second valve attached to the second end of the regenerator housing, the first valve and second valve each comprising a plurality of apertures spaced apart from each other along the circumferential direction with each aperture positioned adjacent to one of the pair of openings of one of the plurality of chambers;
a magnetic element positioned proximate to the regenerator housing and extending along the axial direction, the magnetic element being positioned radially inward from the regenerator housing, the magnetic element creating a magnetic field, the magnetic element positioned so that a subset of the plurality of stages are moved in and out of the magnetic field as the regenerator housing is rotated about the axial direction;

a pair of seals comprising a first seal positioned adjacent to the first valve and a second seal adjacent to the second valve such that the regenerator housing and the pair of valves are rotatable relative to the pair of seals, the first seal and the second seal each comprising a pair of ports positioned in an opposing manner relative to each other and also positioned so that each port can selectively align with at least one of the pair of openings of the plurality of chambers as the regenerator housing is rotated about the axial direction;

an actuator selectively movable linearly along the axial direction parallel to the fluid path, the actuator being operably connected to the magnetic element and configured to move the magnetic element in the axial direction relative to the regenerator housing so as to control the amount of magneto caloric material experiencing the magneto caloric effect at the fluid path as said regenerator housing is rotated about the axial direction; and a temperature sensor configured to measure a temperature away from the regenerator housing and the actuator, wherein the actuator is configured to move axially according to the temperature measured at the temperature sensor.

2. The heat pump system of claim 1, wherein the regenerator housing further comprises a cavity positioned radially-inward of the plurality of chambers, wherein the magnetic element is positioned within the cavity of the regenerator housing.

3. The heat pump system of claim 2, wherein the magnetic element comprises a plurality of magnets arranged in the shape of an arc and configured to project a magnetic field substantially along a radially-outward direction.

4. The heat pump system of claim 3, wherein the arc formed by the plurality of magnets extends about the circumferential direction by an amount in the range of about 170 degrees to about 190 degrees.

5. The heat pump system of claim 4, Wherein the plurality of magnets are arranged in a HalBach army.

6. The heat pump system of claim of claim 1, wherein the regenerator housing defines a radial direction and further comprises a cavity positioned radially-inward of the plurality of chambers, and wherein the magnetic element further comprising a first plurality of magnets positioned within the cavity and a second plurality of magnets positioned radially outward of the regenerator housing.

7. The heat pump system of claim of claim 1, wherein the pair of ports on each of the pair of seals are positioned about the circumferential direction within a range of about 170 degrees to about 190 degrees from each other.

8. The heat pump system of claim 1, further comprising a motor in mechanical communication with the regenerator housing and configured for rotating the regenerator housing about the axial direction.

* * * * *